(12) United States Patent
Faucher et al.

(10) Patent No.: US 7,943,687 B2
(45) Date of Patent: May 17, 2011

(54) CONTINUOUS MICROREACTOR PROCESS FOR THE PRODUCTION OF POLYESTER EMULSIONS

(75) Inventors: Santiago Faucher, Oakville (CA); Mikhail Hanewich-Hollatz, Mississauga (CA); Shigang Qiu, Toronto (CA); David Borbely, Oakland (CA)

(73) Assignee: Xerox Corporation, Norwalk, CT (US)

( * ) Notice: Subject to any disclaimer, the term of this patent is extended or adjusted under 35 U.S.C. 154(b) by 146 days.

(21) Appl. No.: 12/502,452

(22) Filed: Jul. 14, 2009

(65) Prior Publication Data
US 2011/0015320 A1    Jan. 20, 2011

(51) Int. Cl.
*C08K 5/16* (2006.01)
*C08K 5/06* (2006.01)
*C08K 5/05* (2006.01)

(52) U.S. Cl. ........ 524/186; 524/356; 524/366; 524/379; 524/386

(58) Field of Classification Search ............... 524/186, 524/356, 366, 379, 386
See application file for complete search history.

(56) References Cited

U.S. PATENT DOCUMENTS

| | | |
|---|---|---|
| 3,933,954 A | 1/1976 | Gebhard, Jr. et al. |
| 4,056,653 A | 11/1977 | Gebhard, Jr. et al. |
| 5,278,020 A | 1/1994 | Grushkin et al. |
| 5,290,654 A | 3/1994 | Sacripante et al. |
| 5,302,486 A | 4/1994 | Patel et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,354,804 A | 10/1994 | Inada et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,399,597 A | 3/1995 | Mandel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |

(Continued)

FOREIGN PATENT DOCUMENTS

JP    2008-101100    *    5/2008

(Continued)

OTHER PUBLICATIONS

Ehrfeld, W.; Hessel, V.; Löwe, H. Microreactors—New Technology for Modern Chemistry, 1st Edition, Wiley-VCH, Weinheim, 2001, 5-11.

(Continued)

*Primary Examiner* — Milton I Cano
*Assistant Examiner* — John Uselding
(74) *Attorney, Agent, or Firm* — Carter, DeLuca, Farrell & Schmidt, LLP

(57) ABSTRACT

A process and system for continuously making a resin emulsion suitable for use in forming toner particles includes at least one micromixer for micromixing a resin mixture and aqueous phase to continuously produce an emulsion of a high solids content. The process comprises contacting a polyester resin possessing acid groups with a component selected from the group consisting of an organic solvent and a solvent inversion agent to form a resin mixture; neutralizing the resin mixture with a neutralizing agent; and subjecting the resin mixture to micromixing.

18 Claims, 3 Drawing Sheets

U.S. PATENT DOCUMENTS

| | | | |
|---|---|---|---|
| 5,548,004 | A | 8/1996 | Mandel et al. |
| 5,585,215 | A | 12/1996 | Ong et al. |
| 5,650,255 | A | 7/1997 | Ng et al. |
| 5,650,256 | A | 7/1997 | Veregin et al. |
| 5,723,253 | A | 3/1998 | Higashino et al. |
| 5,744,520 | A | 4/1998 | Kmiecik-Lawrynowicz et al. |
| 5,747,215 | A | 5/1998 | Ong et al. |
| 5,763,133 | A | 6/1998 | Ong et al. |
| 5,766,818 | A | 6/1998 | Smith et al. |
| 5,804,349 | A | 9/1998 | Ong et al. |
| 5,827,633 | A | 10/1998 | Ong et al. |
| 5,840,462 | A | 11/1998 | Foucher et al. |
| 5,853,943 | A | 12/1998 | Cheng et al. |
| 5,853,944 | A | 12/1998 | Foucher et al. |
| 5,863,698 | A | 1/1999 | Patel et al. |
| 5,869,215 | A | 2/1999 | Ong et al. |
| 5,902,710 | A | 5/1999 | Ong et al. |
| 5,916,725 | A | 6/1999 | Patel et al. |
| 5,919,595 | A | 7/1999 | Mychajlowskij et al. |
| 5,925,488 | A | 7/1999 | Patel et al. |
| 5,977,210 | A | 11/1999 | Patel et al. |
| 5,994,020 | A | 11/1999 | Patel et al. |
| 6,063,827 | A | 5/2000 | Sacripante et al. |
| 6,080,807 | A | 6/2000 | Campbell |
| 6,512,024 | B1 | 1/2003 | Lundgard et al. |
| 6,562,121 | B2* | 5/2003 | Nickel et al. ............ 106/493 |
| 6,593,049 | B1 | 7/2003 | Veregin et al. |
| 6,756,176 | B2 | 6/2004 | Stegamat et al. |
| 6,830,860 | B2 | 12/2004 | Sacripante et al. |
| 7,064,156 | B2 | 6/2006 | Rink et al. |
| 7,385,001 | B2 | 6/2008 | Shim et al. |
| 7,563,318 | B1* | 7/2009 | Faucher et al. ........... 106/496 |
| 2002/0014179 | A1* | 2/2002 | Nickel et al. ............ 106/31.28 |
| 2002/0074681 | A1 | 6/2002 | Lundgard et al. |
| 2003/0083410 | A1* | 5/2003 | Baur et al. .............. 524/190 |
| 2006/0222991 | A1 | 10/2006 | Sacripante et al. |
| 2006/0228640 | A1* | 10/2006 | Baur et al. ............. 430/108.23 |
| 2006/0241242 | A1* | 10/2006 | Devlin et al. ............ 525/53 |
| 2007/0207402 | A1* | 9/2007 | Takagi et al. ........... 430/110.2 |
| 2008/0107989 | A1 | 5/2008 | Sacripante et al. |
| 2008/0153027 | A1 | 6/2008 | Veregin et al. |
| 2008/0199925 | A1* | 8/2008 | Kong et al. ............... 435/135 |

FOREIGN PATENT DOCUMENTS

| | | |
|---|---|---|
| WO | WO 98/45356 A1 | 10/1998 |
| WO | WO 00/17256 A1 | 3/2000 |

OTHER PUBLICATIONS

Freitas, S., et al. Gander, B. Flow-through ultrasonic emulsification combined with static micromixing for. Eur. J. of Pharma. and Biopharma., 2005, 61(3), 181-187.

Wischke, C.; Borchert, H.-H. Influence of the primary emulsification procedure on the characteristics of small . . . . J. of Microencapsulation, 2006, 23(4), 435-448.

Schalper, K.; Harnisch, S.; Mueller, R.H.; Hildebrand, G.E. Preparation of Microparticles by Micromixers : Characterization of . . . . Pharmaceutical Research, 2005, 22(2), 276-284.

Schalper, K. et al. A novel continuously acting microscale system for preparation of PLGA nano- and microparticles, Jun. 23-27, 2001, 2, 1390-1391.

Pinon-Segundo, E. et al., Preparation of nanoparticles by solvent displacement using a novel . . . . Pharmaceutical Development and Technology, 2006, 11(4), 493-501.

Scholes, P.D. et al, The preparation of sub-200 nanometer poly(lactide-co-glycolide) microspheres for site-specific . . . . J. of Controlled Release, 1993, 25(1-2), 145-53.

* cited by examiner

CONTINUOUS MICROREACTOR PROCESS FOR THE PRODUCTION OF POLYESTER EMULSIONS

TECHNICAL FIELD

The present disclosure relates to processes for producing resin emulsions useful in producing toners. More specifically, continuous processes for emulsification of a polyester resin utilizing a phase inversion emulsification reaction.

BACKGROUND

Numerous processes are within the purview of those skilled in the art for the preparation of toners. Emulsion aggregation (EA) is one such method. Emulsion aggregation toners may be used in forming print and/or xerographic images. Emulsion aggregation techniques may involve the formation of a polymer emulsion by heating a monomer and undertaking a batch or semi-continuous emulsion polymerization, as disclosed in, for example, U.S. Pat. No. 5,853,943, the disclosure of which is hereby incorporated by reference in its entirety. Other examples of emulsion/aggregation/coalescing processes for the preparation of toners are illustrated in U.S. Pat. Nos. 5,902,710; 5,910,387; 5,916,725; 5,919,595; 5,925,488, 5,977,210, 5,994,020, and U.S. Patent Application Publication No. 2008/0107989, the disclosures of each of which are hereby incorporated by reference in their entirety.

Polyester toners with low melt properties have been prepared utilizing amorphous and crystalline polyester resins as illustrated, for example, in U.S. Patent Application Publication No. 2008/0153027, the disclosure of which is hereby incorporated by reference in its entirety. The incorporation of these polyesters into the toner requires that they first be formulated into emulsions prepared by solvent containing batch processes, for example solvent flash emulsification and/or solvent-based phase inversion emulsification (PIE), which is time and energy-consuming.

These batch processes may be difficult to scale-up since the process inputs (i.e. resin acid value) can vary and there are many possible noise variables (i.e. solvent evaporation, $NH_3$ evaporation). For example, variation in the lot-to-lot resin acid value may require different process input variations (i.e. neutralization ratio, solvent ratio) to achieve the desired particle size and may require extensive work before a resin lot is scaled-up. Moreover, it may still produce failed batches. In addition to poor mixing properties, the individual batch process involves the handling of bulk amounts of material, and each process may take many hours to complete before moving to the next process in the formation of the toner, that is, aggregation and/or coalescence. In addition, batch-to-batch consistency is frequently difficult to achieve because of variations that may arise from one batch to another.

It would be advantageous to provide a process for the preparation of a polymer latex suitable for use in a toner product that is more efficient, takes less time, and results in a consistent toner product.

SUMMARY

A process of the present disclosure includes contacting at least one polyester resin possessing acid groups with a component selected from the group consisting of an organic solvent and a solvent inversion agent to form a resin mixture; neutralizing the resin mixture with a neutralizing agent; and subjecting the resin mixture to micromixing in a continuous reactor at flow rates of from about 12 L/hour to about 8000 L/hour to continuously produce an emulsion of a high solids content.

A continuous process is provided which includes contacting at least one polyester resin with an organic solvent to form a mixture; heating the mixture to a desired temperature; diluting the mixture to a desired concentration by adding at least one solvent inversion agent in a first micromixer to form a diluted mixture; mixing an aqueous solution of neutralizing agent with the diluted mixture in a second micromixer; and adding water to the diluted mixture in a third micromixer to continuously mix the diluted mixture until phase inversion occurs resulting in an emulsion with a high solids content.

A system of the present disclosure includes a first micromixer for micromixing a resin mixture including at least one polyester resin, an organic solvent, and a solvent inversion agent; a second micromixer for micromixing the resin mixture with a neutralizing agent; and a third micromixer for micromixing the resin mixture with water to continuously produce an emulsion of a high solids content.

BRIEF DESCRIPTION OF THE FIGURES

Various embodiments of the present disclosure will be described herein below with reference to the figures wherein.

DETAILED DESCRIPTION

Figure 1:
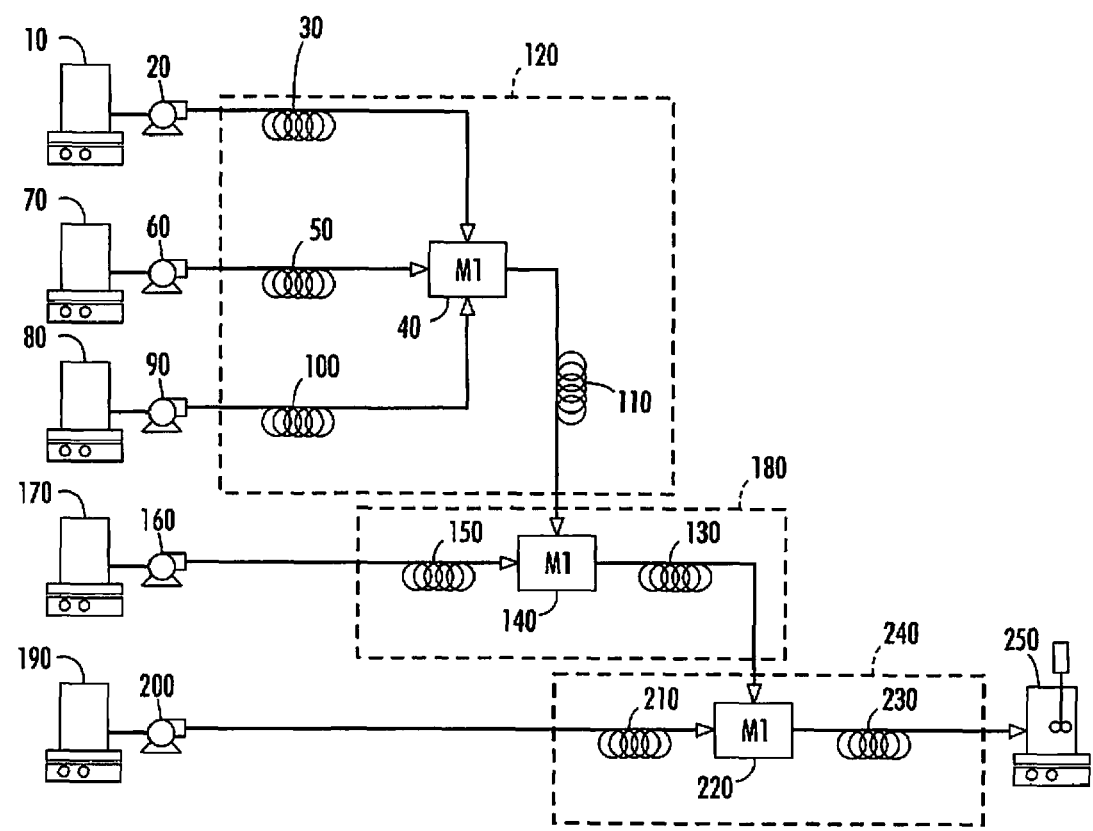
FIG. 1 is a flowchart illustrating a continuous microreactor process for the production of polyester emulsions in accordance with the present disclosure.

Previous disclosures cited above describe processes for making latexes in batch. However, the production of these latexes by a continuous phase inversion process, having a high solids content, have not been explored.

The present disclosure provides processes for forming an emulsion with a high solids content which may then be used for forming a toner, paint, powder, coating, compounding additive for pharmaceuticals, encapsulating a drug, solution coating, adhesive, or food additive via a continuous process. In embodiments, a process of the present disclosure may include contacting at least one polyester resin with an organic solvent to form a resin mixture; heating the resin mixture to a desired temperature and adding at least one solvent inversion agent to the mixture; neutralizing the resin mixture with a neutralizing agent; and micromixing the mixture with water to continuously produce an emulsion having a high solids content.

The present disclosure also provides processes for producing an emulsion containing latex particles using at least one micromixer. In embodiments, a process of the present disclosure includes contacting at least one polyester resin with an organic solvent to form a mixture; heating the mixture to a desired temperature; diluting the mixture to a desired concentration by adding at least one solvent inversion agent in a first micromixer; mixing an aqueous solution of neutralizing agent with the diluted mixture in a second micromixer; and mixing the product of the second micromixer with water in a third micromixer to form a phase inversion resulting in an emulsion with a high solids content.

The present disclosure also provides a system for continuously producing an emulsion with a high solids content, including at least one micromixer for micromixing a resin mixture including at least one polyester resin, an organic solvent, a solvent inversion agent, a neutralizing agent and water.

As used herein, a "micromixer" includes, in embodiments, for example, a continuous flow reactor or microreactor device in which chemical reactions take place in a confinement with typical lateral dimensions below 1 mm and are capable of mixing fluids at flowrates of up to about 8000 L/hour (~2000 gal/hour). However, it is understood that other devices may be used with dimensions in excess of 1 mm at these flow rates in accordance with the present disclosure in the continuous process of forming the emulsion. Such micromixers include, in embodiments, those commercially available as Starlam, Caterpillar, and Simm from IMM, T-type micromixers (eg. Swagelock), static mixers available from Sulzer, dynamic in-line mixers and homogenizers available from Ika, and combinations thereof.

As used herein, a "high solids content" includes, in embodiments, for example, an emulsion having a solids concentration of from about 5 wt % to about 60 wt %, in embodiments from about 10 wt % to about 55 wt %.

Resins

Any resin may be utilized in the present disclosure. In embodiments, the resins may be an amorphous resin, a crystalline resin, and/or a combination thereof. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 5 to about 50 percent by weight of the toner components, in embodiments from about 10 to about 35 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and combinations thereof. The amount of organic diols selected can vary, and may be present, for example, in an amount from about 40 to about 60 mole percent of the resin, in embodiments from about 42 to about 55 mole percent of the resin, in embodiments from about 45 to about 53 mole percent of the resin.

In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly (propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly (propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

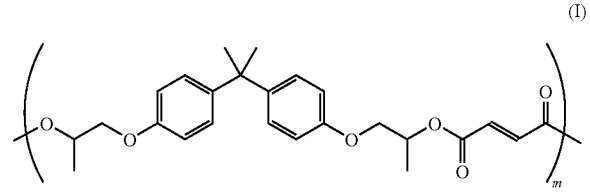

(I)

wherein m may be from about 5 to about 1000. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

Suitable crystalline resins which may be utilized, optionally in combination with an amorphous resin as described above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

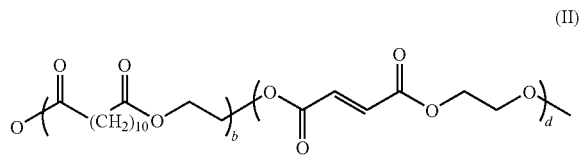

(II)

wherein b is from about 5 to about 2000 and d is from about 5 to about 2000.

For example, in embodiments, a poly(propoxylated bisphenol A co-fumarate) resin of formula I as described above may be combined with a crystalline resin of formula II to form an emulsion.

The amorphous resin may be present, for example, in an amount of from about 30 to about 90 percent by weight of the toner components, in embodiments from about 40 to about 80 percent by weight of the toner components. In embodiments, the amorphous resin or combination of amorphous resins utilized in the latex may have a glass transition temperature of from about 30° C. to about 80° C., in embodiments from about 35° C. to about 70° C. In further embodiments, the combined resins utilized in the latex may have a melt viscosity of from about 10 to about 1,000,000 Pa*S at about 130° C., in embodiments from about 50 to about 100,000 Pa*S.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 10% (first resin)/90% (second resin) to about 90% (first resin)/10% (second resin), Where the resin includes an amorphous resin and a crystalline resin, the weight ratio of the two resins may be from about 99% (amorphous resin): 1% (crystalline resin), to about 1% (amorphous resin): 90% (crystalline resin).

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

Solvent

Any suitable organic solvent may be used to dissolve the resin, for example, alcohols, esters, ethers, ketones, amines, the like, and combinations thereof, in an amount of, for example, from about 10 wt % to about 80 wt % resin, in embodiments, from about 20% to about 50%.

In embodiments, suitable organic solvents include, for example, methanol, ethanol, propanol, isopropanol, butanol, ethyl acetate, methyl ethyl ketone, and the like, and combinations thereof. In embodiments, the organic solvent may be immiscible in water and may have a boiling point of from about 30° C. to about 100° C.

Any suitable organic solvent noted hereinabove may also be used as a phase or solvent inversion agent, and may be utilized in an amount of from about 1 wt % to about 25 wt % of the resin, in embodiments from about 5 wt % to about 20 wt %.

Neutralizing Agent

Once obtained, the resin may be mixed at an elevated temperature, with a highly concentrated base or neutralizing agent added thereto. In embodiments, the base may be a solid or added in the form of a highly concentrated solution.

In embodiments, the neutralizing agent may be used to neutralize acid groups in the resins, so a neutralizing agent herein may also be referred to as a "basic neutralization agent." Any suitable basic neutralization agent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof, and the like. Suitable basic agents may also include monocyclic compounds and polycyclic compounds, having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polycyclic compounds may be unsubstituted or substituted at any carbon position on the ring.

In embodiments, an emulsion formed in accordance with the present disclosure may also include a small quantity of water, in embodiments, de-ionized water (DIW), in amounts of from about 30% to about 95%, in embodiments, of from about 30% to about 60%, at temperatures that melt or soften the resin, of from about 40° C. to about 140° C., in embodiments from about 60° C. to about 100° C.

The basic agent may be utilized so that it is present in an amount of from about 0.001% by weight to 50% by weight of the resin, in embodiments from about 0.01% by weight to about 25% by weight of the resin, in embodiments from about 0.1% by weight to 5% by weight of the resin. In embodiments, the neutralizing agent may be added in the form of an aqueous or organic solution or neat at a flow rate of from about 0.1 ml/min to about 8000 L/hour.

As noted above, the basic neutralization agent may be added to a resin possessing acid groups. The addition of the basic neutralization agent may thus raise the pH of an emulsion including a resin possessing acid groups from about 5 to about 12, in embodiments, from about 6 to about 11. The neutralization of the acid groups may, in embodiments, enhance formation of the emulsion.

Surfactants

In embodiments, the process of the present disclosure may include adding a surfactant to the resin, before or during the mixing at an elevated temperature, thereby enhancing formation of the phase inversed emulsion. In embodiments, the surfactant may be added prior to mixing the resin at an elevated temperature. In embodiments, the surfactant may be added before, during, or after the addition of the basic agent. In embodiments, the surfactant may be added after heating with the addition of water to form the phase inversed latex. Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a highly concentrated solution with a concentration of from about 5% to about 100% (pure surfactant) by weight, in embodiments, from about 10% to about 95% by weight. In embodiments, the surfactant may be utilized so that it is present in an amount of from about 0.01% to about 20% by weight of the resin, in embodiments, from about 0.1% to about 10% by weight of the resin, in other embodiments, from about 1% to about 8% by weight of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy)ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing nonionic surfactants may be utilized in embodiments.

Processing

In embodiments, the emulsification process noted above can be practiced as a batch or continuous process. The process includes mixing at least one resin at an elevated temperature, in the presence of an organic solvent. More than one resin may be utilized. The resin may be an amorphous resin, a crystalline resin, or a combination thereof. In embodiments, the resin may be an amorphous resin and the elevated temperature is a temperature above the glass transition temperature of the resin. In other embodiments, the resin may be a crystalline resin and the elevated temperature is a temperature above the melting point of the resin. In further embodiments, the resin may be a mixture of amorphous and crystalline resins and the temperature is above the glass transition temperature of the mixture.

Thus, in embodiments, the process of making the emulsion includes contacting at least one resin with an organic solvent, heating the resin mixture to an elevated temperature, stirring or mixing the mixture, and, while maintaining the temperature at the elevated temperature, adding a solvent inversion agent to the resin mixture to dilute the mixture to a desired concentration, adding a neutralizing agent to neutralize the acid groups of the resin, and adding water into the mixture until phase inversion occurs to form a phase inversed emulsion. In embodiments, the emulsion is continuously produced with a high solids content utilizing at least one micromixer or any suitable reaction vessel for mixing the mixture at flow rates of up to about 8000 L/hour. In embodiments, micromixing the mixture occurs at temperatures of from about 20° C. to about 100° C.

In other embodiments, a process of the present disclosure may include pumping at least one polyester resin solution possessing acid groups into a micromixer, and pumping at least one additional solvent or solvent inversion agent into the micromixer to form a continuous product stream consisting of a mixture of the feed streams; introducing the product from the first micromixer continuously into a second micromixer where a neutralizing agent is pumped in to the second micromixer to neutralize the acid end groups of the resin; and introducing the product from the second micromixer into a third micromixer where water is pumped in to the third micromixer to continuously mix and produce an emulsion of a high solids content.

In the phase inversion process, the amorphous and/or crystalline polyester resin may be dissolved in a low boiling organic solvent, which solvent is immiscible in water, such as ethyl acetate, methyl ethyl ketone, or any other solvent noted hereinabove, at a concentration of from about 10 wt % to about 60 wt % of resin in solvent. The resin mixture is then heated to a temperature of about 25° C. to about 90° C., in embodiments from about 30° C. to about 85° C. The heating need not be held at a constant temperature, but may be varied. For example, the heating may be slowly or incrementally increased during heating until a desired temperature is achieved.

While the temperature is maintained in the aforementioned range, the solvent inversion agent may be added to the mixture. The solvent inversion agent, such as an alcohol like isopropanol, or any other solvent inversion agent noted hereinabove, in a concentration of from about 1 wt % to about 25 wt % of the resin, may be added to the heated resin mixture, followed by the addition of water, or optionally an alkaline base, such as ammonia, allowing phase inversion to occur (oil in water).

The aqueous alkaline composition and optional surfactant may be metered into the heated mixture at least until phase inversion is achieved. In other embodiments, the aqueous alkaline composition and optional surfactant may be metered into the heated mixture, followed by the addition of an aqueous solution, in embodiments deionized water, until phase inversion is achieved.

In embodiments, a continuous phase inversed emulsion may be formed. Phase inversion can be accomplished by continuously mixing an aqueous alkaline solution or basic agent, and/or water with the resin mixture to create a phase inversed emulsion continuously including a disperse phase containing droplets possessing the ingredients of the resin composition and a continuous aqueous phase.

In embodiments, a process of the present disclosure may include heating one or more ingredients of a resin composition to an elevated temperature continuously while pumping this mixture into a micromixer, where a second stream containing the base or neutralizing agent, optionally in an aqueous alkaline solution, is continuously pumped into the same micromixer to form a phase inversed emulsion continuously.

As noted above, in accordance with the present disclosure, a neutralizing agent may be useful, in embodiments, where the resin utilized possesses acid groups. The neutralizing agent may neutralize the acidic groups of the resin, thereby enhancing the formation of the phase-inversed emulsion and formation of particles suitable for use in forming toner compositions.

In embodiments, the neutralizing agent may be added at a rate of from about 0.01% wt % to about 10 wt %, in embodiments from about 0.5 wt % to about 5 wt %, in other embodiments from about 1 wt % to about 4 wt %. In embodiments, the neutralizing agent may be added in the form of an aqueous solution at a flow rate of from about 0.1 ml/min to about 8000 L/hour. The rate of addition of the neutralizing agent need not be constant, but can be varied.

Although the point of phase inversion may vary depending on the components of the emulsion, the temperature of heating, the stirring speed, and the like, phase inversion may occur when basic neutralization agent, optional surfactant, and/or water has been added so that the resulting resin is present in an amount from about 5 wt % to about 70 wt % by weight of the emulsion, in embodiments from about 20 wt % to about 65 wt % by weight of the emulsion, in other embodiments from about 30 wt % to about 60 wt % by weight of the emulsion.

In embodiments, following the production of the phase inversion, the product can be distilled to remove the organic solvent and provide resin emulsion particles with an average diameter size of, for example, in embodiments from about 50 nm to about 500 nm, in other embodiments from about 100 to about 300 nanometers.

At phase inversion, the resin particles become emulsified and dispersed within the aqueous phase. That is, an oil-in-water emulsion of the resin particles in the aqueous phase is formed. Phase inversion may be confirmed by, for example, measuring via any of the techniques within the purview of those skilled in the art.

Mixing of the various components in the continuous process are essential in order to form the phase inversed emulsion. Any suitable continuous static or dynamic mixing device may be utilized. A homogenizer (that is, a high shear device), may be utilized to form the phase inversed emulsion, but in other embodiments, the process of the present disclosure may take place without the use of a homogenizer. Where utilized, a homogenizer may operate at a rate of from about 3,000 rpm to about 10,000 rpm.

As noted above, the process may further include utilization of at least one continuous reactor or micromixer or microreactor that permits high throughput experimental screening and full scale production of latexes having high solids content. In embodiments, the preparation of polyester emulsions of the present disclosure may include dissolution of at least one resin in at least one organic solvent, heating the mixture to an elevated temperature, neutralization using a neutralizing agent, its inversion through micromixing with a solvent inversion agent and water, and finally distillation of the solvent from the emulsion via a continuous process. This process offers several advantages over current batch solvent-based processes for the formation of emulsions both at the laboratory and industrial scale.

At the laboratory scale, the process allows several experiments (at least greater than 10) to be undertaken in one day. In contrast, the same work using a batch reactor may take up to about a week to complete due to the requirement of a large amount of setup and take-down/clean-up time between experiments. For the microreactor/continuous process, there is no down time between experiments as the nature of the process allows conditions to be changed while running.

In addition, micromixers form micro-domains with much smaller dimensions that reduce diffusion path lengths and therefore greatly, by an order of magnitude, accelerate mixing, over a typical batch scale laboratory reactor. Microreactors also offer accurate control of process conditions (mixing, temperature control, residence time) that allow production of well controlled tailored materials. Accordingly, the use of micromixers may greatly accelerate latex production over the batch process and permit tight control of product properties.

At the production scale, the continuous microreactor process also offers several important advantages. Due to difficult control of polyester resin properties on account of the kinetic profile of condensation polymerizations, lot-to-lot variations may challenge downstream latex production processes since the latex process recipe depends on these properties. Therefore, some adjustments must be made to compensate for property variation. For example, the lot-to-lot variation in the polyester resins means that the batch phase inversion emulsification (PIE) process will have to be scaled-up for each lot, requiring extensive laboratory and pilot-plant work prior to every production run. For example, to adjust the latex process formulation for lot-to-lot resin variations, two 10 L batch reactions have to be run prior to scaling-up each lot to a 30 gallon scale. Thus, six operator days are used to produce the final latex. At a full PIE production scale (about 3000 gallons), this problem is further exacerbated and the potential for batches that are off-specification is high. Therefore, in a batch process, the final product characteristics are not evident until the batch has been completed.

This scale-up dependence can be eliminated in a continuous microreactor process since the recipe adjustments i.e. neutralization ratio, solvent ratio, etc., may be made while running the process using on-line monitoring and feedback control. Overall, this approach wastes less material than a batch scale-up process and eliminates the potential for off-specification batches. Thus, the time to market for the product is greatly reduced. At the industrial scale, the laboratory microreactor process can be scaled-up using a StarLam micromixer (commercially available from IMM) capable of mixing fluids at flowrates of from about 12 to about 8000 L/hour (~2000 gal/hour).

The continuous microreactor process of the present disclosure for the production of polyester emulsions using PIE permits high throughput experimental screening, high throughput production rates, eliminates or minimizes wasted product, greatly reduces time to market for the latex production, and produces latexes with high solids content. The process relies on micromixers to intimately mix, or micromix aqueous and oil resin phases that form part of the PIE process as shown in FIG. 1. In the first step, a resin solution may be diluted to the desired concentration by micromixing in at least one solvent inversion agent in a first micromixer 40. In the second step, the diluted resin solution may be mixed in a second micromixer 140 with an aqueous solution of NaOH that neutralizes the acid end groups on the resin. By varying the flowrates of the solvents and neutralizing solutions, the resin concentration, organic phase composition, and degree of neutralization can be controlled while continuously producing an emulsion. This allows for the on-line continuous control of latex particle size. A third micromixer 240 may be used downstream to mix water with the neutralized resin to form the latex. It is envisioned that other reaction vessels and mixers may be utilized in the process.

More specifically, as illustrated in FIG. 1, a resin pump 20 delivering a mixture of resin and solvent from dissolved resin tank 10 is connected through ¼" tubing to a tubular reactor 30 that heats the resin to the desired temperature. The temperature is set by adjusting the temperature bath 120 within which this reactor is placed. The tubular reactor 30 may be constructed of ¼" tubing that is about 1 meter in length but any device that permits the heating of the solution to the desired temperature at the exit from the tubular reactor 30 may be used (for example, a shell and tube heat exchanger). The resin tubular reactor 30 is connected to a micromixer 40. An organic solvent is fed into micromixer 40 via a pump 90 from solvent tank 80 and a solvent inversion agent is fed into micromixer 40 via a pump 60 from solvent inversion tank 70. Both solvents are heated via heat exchangers 100 and 50, respectively. Thus, in the first micromixer, the product resin solution concentration, and composition is set.

This resin mixture is then fed to a second micromixer 140 where it is mixed with a neutralizing solution delivered via pump 160 from neutralizer tank 170 while heated via heat exchanger 150. The temperature is set by adjusting the temperature bath 180 within which this reactor is placed. The flowrate and concentration of the neutralizing solution dictates the degree of resin neutralization.

The resin solution product from this second micromixer 140 is then fed into a third micromixer 240 where it is mixed with water delivered via pump 200 from water tank 190 while heating with heat exchanger 210. The temperature is set by adjusting the bath 220 within which this reactor is placed. In all cases, the micromixers may include two short inlet (3 cm) 1/16" segments of tubing connected to a 1/16" swagelock T and a longer 1/16" outlet tubing varying in length from about 30 cm to about 100 cm. Any micromixer providing suitable resistance to flow that creates intimate mixing of the fluids may be utilized in carrying out this continuous process. Higher resistances to flow may also be utilized so long as the pumps are capable of supplying the process. Residence time units 110, 130, and 230 may be utilized after micromixers 40, 140, and 240, respectively, in order to achieve the required residence times necessary for the various process steps. The product solution from the third micromixer 240 is the final latex product and is collected in the latex receiving tank 250.

As the resin and water solutions enter the micromixer they quickly mix on account of the sub-micron dimensions internal to the micromixer. The sub-micron dimensions lead to very narrow diffusion path lengths and to high shear zones that stretch, break-up, and mix the two phases. As the phases mix in the third micromixer 240, an emulsion forms driven by the mechanical energy expended in the micromixer 240 and on account of the process chemistry. The neutralized resin contains hydrophilic end groups that may drive the formation of, and later, stabilize the emulsion. The opaque white latex formed in the micromixer 240 exits the reactor continuously. Samples of the latex may be taken to monitor the process and analyzed using a Nanotrack particle size analyzer. Adjustments in particle size can be made by modifying the ratio of water to resin flowrates, the neutralization ratio, solvent concentration, and solvent composition.

Following phase inversion, additional water, and/or aqueous alkaline solution may optionally be added to dilute the phase inversed emulsion, although this is not required. Following phase inversion, the phase inversed emulsion may be cooled to room temperature, for example from about 20° C. to about 25° C.

The emulsified resin particles in the aqueous medium may have a submicron size, for example of about 1 μm or less, in embodiments about 500 nm or less, such as from about 10 nm to about 500 nm, in embodiments from about 50 nm to about 400 nm, in other embodiments from about 100 nm to about 300 nm, in some embodiments about 200 nm.

Toner

The emulsion thus formed as described above may be utilized to form toner compositions by any method within the purview of those skilled in the art. The emulsion may be contacted with a colorant, optionally in a dispersion, and other additives to form a toner by a suitable process, in embodiments, an emulsion aggregation and coalescence process.

In embodiments, the optional additional ingredients of a toner composition including colorant, wax, and other additives may be melt mixed into the resin to be emulsified by the current process to form the latex. Alternatively the additional ingredients may be added after the formation of the emulsion as a separate aqueous disperse phase.

Colorants

As the colorant to be added, various known suitable colorants, such as dyes, pigments, mixtures of dyes, mixtures of pigments, mixtures of dyes and pigments, and the like, may be included in the resin. In embodiments, the colorant may be included in the resin in an amount of, for example, about 0.1 to about 35% by weight of the resin, or from about 1 to about 15% by weight of the resin, or from about 3 to about 10% by weight of the resin.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used.

In general, suitable colorants may include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Toluidine Red (Aldrich), Scarlet for Thermoplast NSD PS PA (Ugine Kuhlmann of Canada), Lithol Rubine Toner (Paul Uhlrich), Lithol Scarlet 4440 (BASF), NBD 3700 (BASF), Bon Red C (Dominion Color), Royal Brilliant Red RD-8192 (Paul Uhlrich), Oracet Pink RF (Ciba Geigy), Paliogen Red 3340 and 3871K (BASF), Lithol Fast Scarlet IA300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Uhlrich), Paliogen Yellow 152 and 1560 (BASF), Lithol Fast Yellow 0991K (BASF), Paliotol Yellow 1840 (BASF), Novaperm Yellow FGL (Hoechst), Permanerit Yellow YE 0305 (Paul Uhlrich), Lumogen Yellow D0790 (BASF), Sunsperse Yellow YHD 6001 (Sun Chemicals), Suco-Gelb 1250 (BASF), Suco-Yellow D1355 (BASF), Suco Fast Yellow D1165, D1355 and D1351 (BASF), Hostaperm Pink E™ (Hoechst), Fanal Pink D4830 (BASF), Cinquasia Magenta™ (DuPont), Paliogen Black L9984 (BASF), Pigment Black K801 (BASF), Levanyl Black A-SF (Miles, Bayer), combinations of the foregoing, and the like.

Specific examples of pigments include Sunsperse BHD 6011X (Blue 15 Type), Sunsperse BHD 9312X (Pigment Blue 15 74160), Sunsperse BHD 6000X (Pigment Blue 15:3 74160), Sunsperse GHD 9600X and GHD 6004X (Pigment Green 7 74260), Sunsperse QHD 6040X (Pigment Red 122 73915), Sunsperse RHD 9668X (Pigment Red 185 12516), Sunsperse RHD 9365X and 9504X (Pigment Red 57 15850:1, Sunsperse YHD 6005X (Pigment Yellow 83 21108), Flexiverse YFD 4249 (Pigment Yellow 17 21105), Sunsperse YHD 6020X and 6045X (Pigment Yellow 74 11741), Sunsperse YHD 600X and 9604X (Pigment Yellow 14 21095), Flexiverse LFD 4343 and LFD 9736 (Pigment Black 7 77226), Aquatone, combinations thereof, and the like, as water based pigment dispersions from Sun Chemicals, Heliogen Blue L6900™, D6840™, D7080™, D7020™, Pylam Oil Blue™, Pylam Oil Yellow™, Pigment Blue 1™ available from Paul Uhlich & Company, Inc., Pigment Violet 1™, Pigment Red 48™, Lemon Chrome Yellow DCC 1026™, E.D. Toluidine Red™ and Bon Red C™ available from Dominion Color Corporation, Ltd., Toronto, Ontario, Novaperm Yellow FGL™, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosures.

In embodiments, a pigment or colorant may be employed in an amount of from about 1% by weight to about 35% by weight of the toner particles on a solids basis, in other embodiments, from about 5% by weight to about 25% by weight.

Wax

Optionally, a wax may also be melt mixed into the resin in order to include it into the latex dispersion produced by the continuous process. The wax may alternatively be provided as a dispersion, in which case this dispersion is added continuously to the latex dispersion produced by the micro-mixer process. In both cases a single type of wax or a mixture of two or more different waxes can be used. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1% by weight to about 25% by weight of the resin, in embodiments from about 5% by weight to about 20% by weight of the resin.

When a wax is used, the wax may include any of the various waxes conventionally used in emulsion aggregation toner compositions. Waxes that may be selected include waxes having, for example, an average molecular weight of from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

Toner Preparation

The toner particles may be prepared by any method within the purview of one skilled in the art. Although embodiments relating to toner particle production are described below with respect to emulsion aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety.

In embodiments, toner compositions may be prepared by emulsion aggregation processes, such as a process that includes aggregating a mixture of an optional colorant, an optional wax and any other desired or required additives, and emulsions including the resins described above, optionally in surfactants as described above, and then coalescing the aggregate mixture.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

Figure 2:
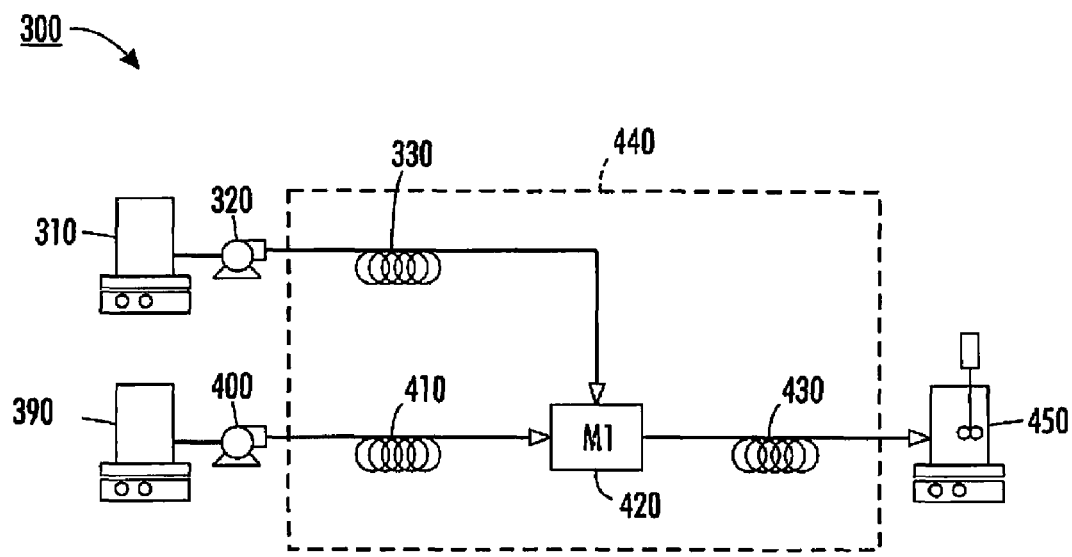
FIG. 2 is flowchart summarizing the continuous emulsification process using a microreactor plant as described in Example 1 in accordance with the present disclosure.

Continuous emulsification of an amorphous resin in a microreactor. FIG. 2 summarizes the process flow sheet for the continuous emulsification process using a microreactor plant 300. About 200 grams of XH1, an amorphous resin commercially available from Kao Corporation, about 138 grams of methyl ethyl ketone (MEK) and about 30 grams of 2-Propanol were added to reaction vessel 310, heated via a hot plate, and allowed to dissolve at a temperature of about 48° C. with stirring for about 1 hour. About 9.5 ml of a 3.5M sodium hydroxide (NaOH) aqueous solution was then added dropwise to this resin solution and the combination was left to stir for about 20 minutes at a temperature of about 43° C. The neutralized resin solution was fed into a syringe pump 320 (a Teledyne Isco 500D) with a specially designed filling apparatus. The pump 320 delivered the neutralized solution at a rate of about 10 ml/minute through a heat exchanger 330 to a micromixer 420 set in a bath 440 at a temperature of about 95°

Figure 3:
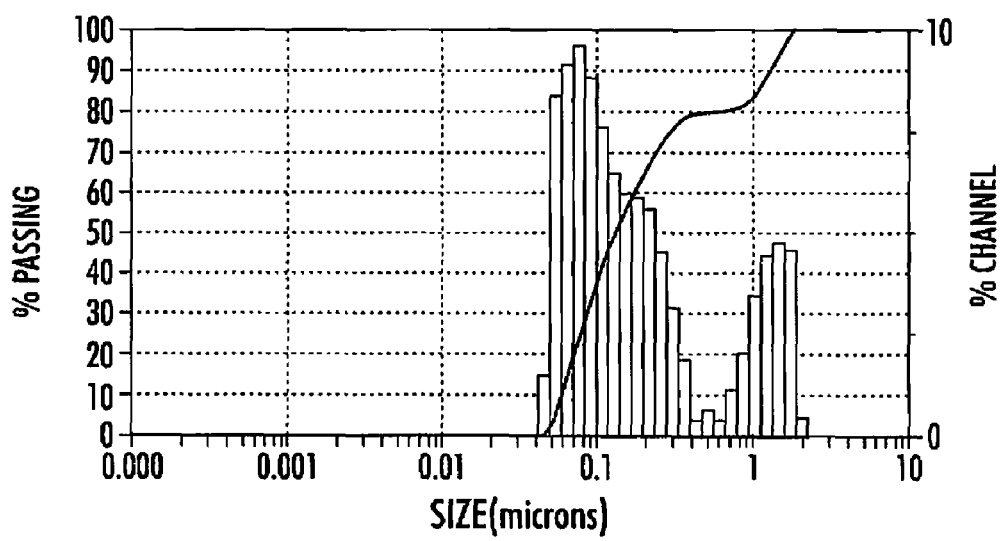
FIG. 3 is a graph depicting particle sizes of resins produced in Example 1 in accordance with the present disclosure.

C. De-ionized water (DIW), heated via heat exchanger 410, was fed to the micromixer 420 by a Knauer pump 400 at a rate of about 10 ml/minute. A latex was produced by the micromixer 420 and recovered in the latex receiving tank 450 with the particle size distribution shown in FIG. 3. As illustrated in FIG. 3, the particle size of the latex ranged from about 0.01 microns to about 3 microns.

Example 2

Figure 4:
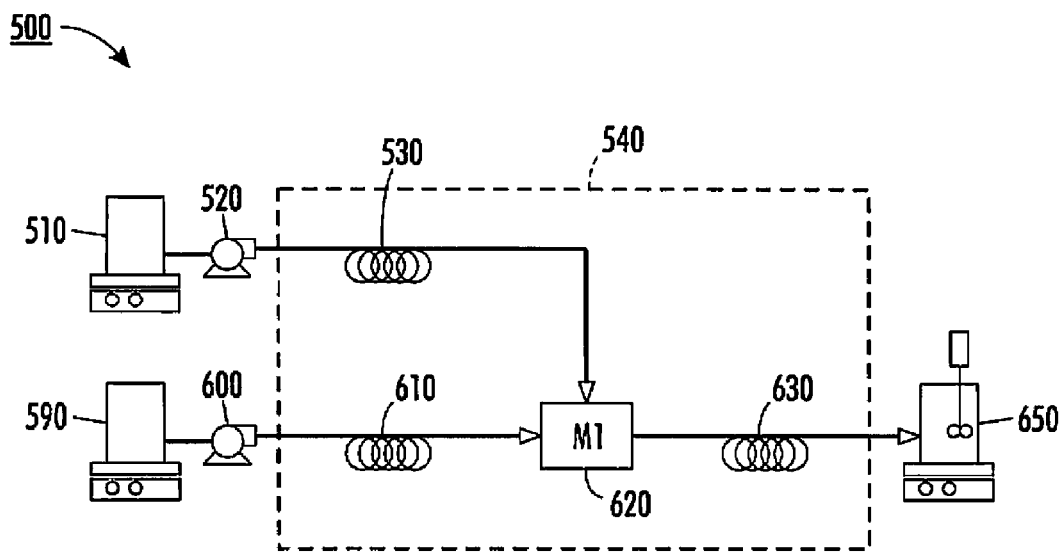
FIG. 4 is flowchart summarizing the continuous emulsification process using a microreactor plant as described in Example 2 in accordance with the present disclosure.
Figure 5:
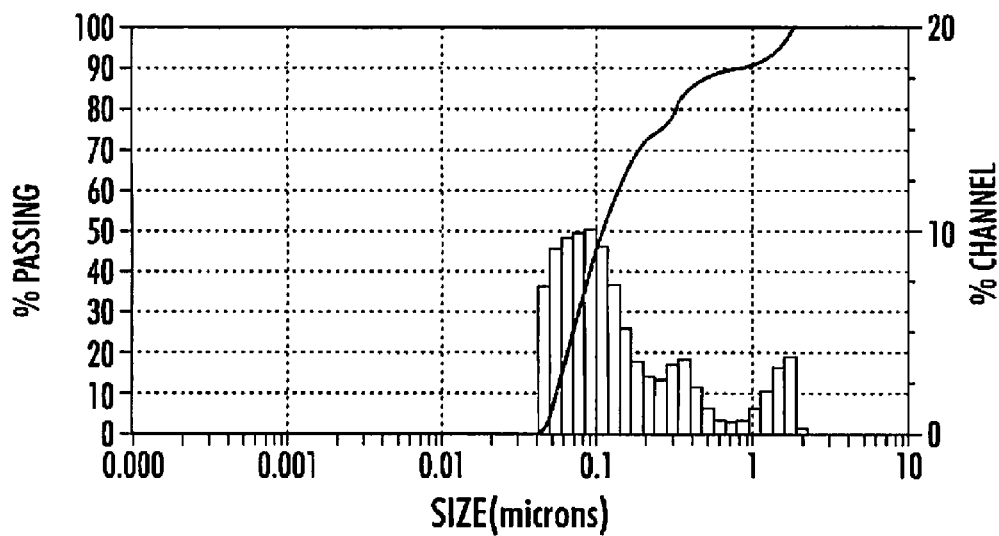
FIG. 5 is a graph depicting particle sizes of resins produced in Example 2 in accordance with the present disclosure.

Continuous emulsification of an amorphous resin in a microreactor. FIG. 4 summarizes the process for the continuous emulsification process using a microreactor plant 500. About 200 grams of XH1, an amorphous resin commercially available from Kao Corporation, about 138 grams of MEK, and about 30 grams of 2-propanol was added to a tank 510 to dissolve the resin at a temperature of about 48° C., heated via a hotplate with stirring for about 1 hour. About 9.5 ml of a 3M NaOH aqueous solution was then added dropwise to this resin solution and the combination was left to stir for about 20 minutes at a temperature of about 43° C. This neutralized resin solution was fed into a syringe pump 520 with a specially designed filling apparatus. The pump 520 delivered the neutralized solution at a rate of about 10 ml/minute through a heat exchanger 530 to a micromixer 620 set in a bath 540 at a temperature of about 95° C. DIW, heated via heat exchanger 610, was fed to the micromixer 620 by a Knauer pump 600 at a rate of about 9 ml/minute. A latex was produced by the micromixer 620 and collected in latex receiving tank 650 with the particle size distribution shown in FIG. 5. As illustrated in FIG. 5, the particle size of the latex ranged from about 0.01 microns to about 3 microns.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process for producing a resin emulsion comprising:
   contacting at least one polyester resin possessing acid groups with a component selected from the group consisting of an organic solvent and a solvent inversion agent to form a resin mixture;
   neutralizing the resin mixture with a neutralizing agent; and
   subjecting the resin mixture to micromixing in a continuous reactor at flow rates of from about 12 L/hour to about 8000 L/hour to continuously produce an emulsion of a high solids content.

2. The process according to claim 1, wherein the polyester resin is selected from the group consisting of amorphous resins, crystalline resins, and combinations thereof.

3. The process according to claim 1, wherein micromixing occurs at a temperature of from about 20° C. to about 100° C.

4. The process according to claim 1, wherein the neutralizing agent is added in the form of an aqueous solution at a flow rate of from about 0.1 ml/min to about 8000 L/hour, and wherein the neutralizing agent is selected from the group consisting of ammonium hydroxide, potassium hydroxide, sodium hydroxide, sodium carbonate, sodium bicarbonate, lithium hydroxide, potassium carbonate, organoamines, and combinations thereof, and raises the pH of the emulsion to from about 5 to about 12.

5. The process according to claim 1, further comprising adding water at a flow rate of from about 0.1 ml/min to about 4000 L/hour optionally in combination with a surfactant.

6. The process according to claim 1, wherein the process occurs in at least one micromixer.

7. The process according to claim 1, wherein the emulsion comprises a solids content of from about 5% to about 70%.

8. The process according to claim 1, further comprising the step of heating the resin mixture to a temperature of from about 25° C. to about 90° C.

9. A process in accordance with claim 1, wherein the organic solvent comprises at least one of an alcohol, ester, ether, ketone, or an amine in an amount of from about 10 wt % to about 60 wt % of the polyester resin, and wherein the solvent inversion agent is an alcohol of at least one of methanol, ethanol, propanol, butanol, pentanol, ethylene glycol, or propylene glycol in an amount of from about 1 wt % to about 25 wt % of the polyester resin.

10. A process in accordance with claim 1, wherein the polyester resin comprises a crystalline polyester resin and has a number average molecular weight of from about 1,000 to about 50,000, a weight average molecular weight of from about 2,000 to about 100,000, and a molecular weight distribution of from about 2 to about 6.

11. A continuous process for producing a resin emulsion comprising:
    contacting at least one polyester resin with an organic solvent to form a mixture;
    heating the mixture to a desired temperature;
    diluting the mixture to a desired concentration by adding at least one solvent inversion agent in a first micromixer to form a diluted mixture;
    mixing an aqueous solution of neutralizing agent with the diluted mixture in a second micromixer; and
    adding water to the diluted mixture in a third micromixer to continuously mix the diluted mixture until phase inversion occurs resulting in an emulsion with a high solids content.

12. The process according to claim 11, wherein the micromixers are capable of mixing fluids at a flow rate of from about 12 L/hour to about 8000 L/hour.

13. The process according to claim 11, wherein the polyester resin comprises a polyester resin selected from the group consisting of amorphous resins, crystalline resins, and combinations thereof, possessing acid groups.

14. The process according to claim 11, wherein the neutralizing agent is added in the form of an aqueous solution at a flow rate of from about 0.1 ml/min to about 4000 L/hour and is selected from the group consisting of ammonium hydroxide, potassium hydroxide, sodium hydroxide, sodium carbonate, sodium bicarbonate, lithium hydroxide, potassium carbonate, organoamines, and combinations thereof, and raises the pH of the emulsion to from about 5 to about 12.

15. The process according to claim 11, wherein water is added at a flow rate of from about 0.1 ml/min to about 4000 L/hour, optionally with a surfactant, and wherein the mixture is heated to a temperature of from about 25° C. to about 90° C.

16. The process according to claim 11, wherein the emulsion comprises a solids content of from about 5% to about 70%.

17. A process in accordance with claim 11, wherein the organic solvent comprises at least one of an alcohol, ester, ether, ketone, or an amine in an amount of from about 10 wt % to about 60 wt % of the polyester resin, and wherein the inversion agent is an alcohol of at least one of methanol, ethanol, propanol, butanol, pentanol, ethylene glycol, or propylene glycol in an amount of from about 1 wt % to about 25 wt % of the polyester resin.

18. A process in accordance with claim 11, wherein the polyester resin comprises a crystalline polyester resin and has a number average molecular weight of from about 1,000 to about 50,000, a weight average molecular weight of from about 2,000 to about 100,000, and a molecular weight distribution of from about 2 to about 6.

* * * * *